United States Patent [19]

Gueldenpfennig et al.

[11] 3,859,474

[45] Jan. 7, 1975

[54] PRIVATE AUTOMATIC BRANCH EXCHANGE WITH CENTRAL OFFICE FEATURES

[75] Inventors: Klaus Gueldenpfennig, Penfield; Uwe A Pommerening, Webster; Stanley L. Russell, West Webster, all of N.Y.

[73] Assignee: Stromberg-Carlson Corporation, Rochester, N.Y.

[22] Filed: Sept. 29, 1972

[21] Appl. No.: 293,518

[52] U.S. Cl. ........................ 179/27 DA, 179/18 BD

[51] Int. Cl. ........................................ H04m 3/64

[58] Field of Search ......... 179/18 BD, 18 B, 18 AD, 179/18 D, 27 F, 27 FH, 27 CA, 27 FF, 27 D, 27 DA

[56] References Cited

UNITED STATES PATENTS

| | | | |
|---|---|---|---|
| 3,377,434 | 4/1968 | Banks et al. | 179/27 CA |
| 3,496,303 | 2/1970 | Pharis | 179/18 B |
| 3,513,263 | 5/1970 | Bastian et al. | 179/18 AD X |
| 3,546,393 | 12/1970 | Joel, Jr. | 179/18 B |
| 3,637,947 | 1/1972 | Breen | 179/27 FH |
| 3,714,378 | 1/1973 | Kimura et al. | 179/18 B |

FOREIGN PATENTS OR APPLICATIONS

| | | | |
|---|---|---|---|
| 280,920 | 3/1965 | Australia | 179/18 BD |

*Primary Examiner*—Thomas W. Brown
*Attorney, Agent, or Firm*—Donald R. Antonelli; William F. Porter, Jr.

[57] ABSTRACT

A private branch automatic exchange system of substantially unlimited size which includes the combination of a central office with an operator complex, including a plurality of operator position circuits connectable to a plurality of trunk circuits through an operator service link network and a plurality of transfer circuits which make available call transfer to subscribers having the proper class of service in combination with a central office including a line link network, a trunk link network and a service link network through which subscribers may be connected to one another and to selected trunk circuits under control of common control equipment.

25 Claims, 4 Drawing Figures

Patented Jan. 7, 1975 3,859,474

4 Sheets-Sheet 1

FIG I

PRIVATE AUTOMATIC BRANCH EXCHANGE WITH CENTRAL OFFICE FEATURES

Figure 1:
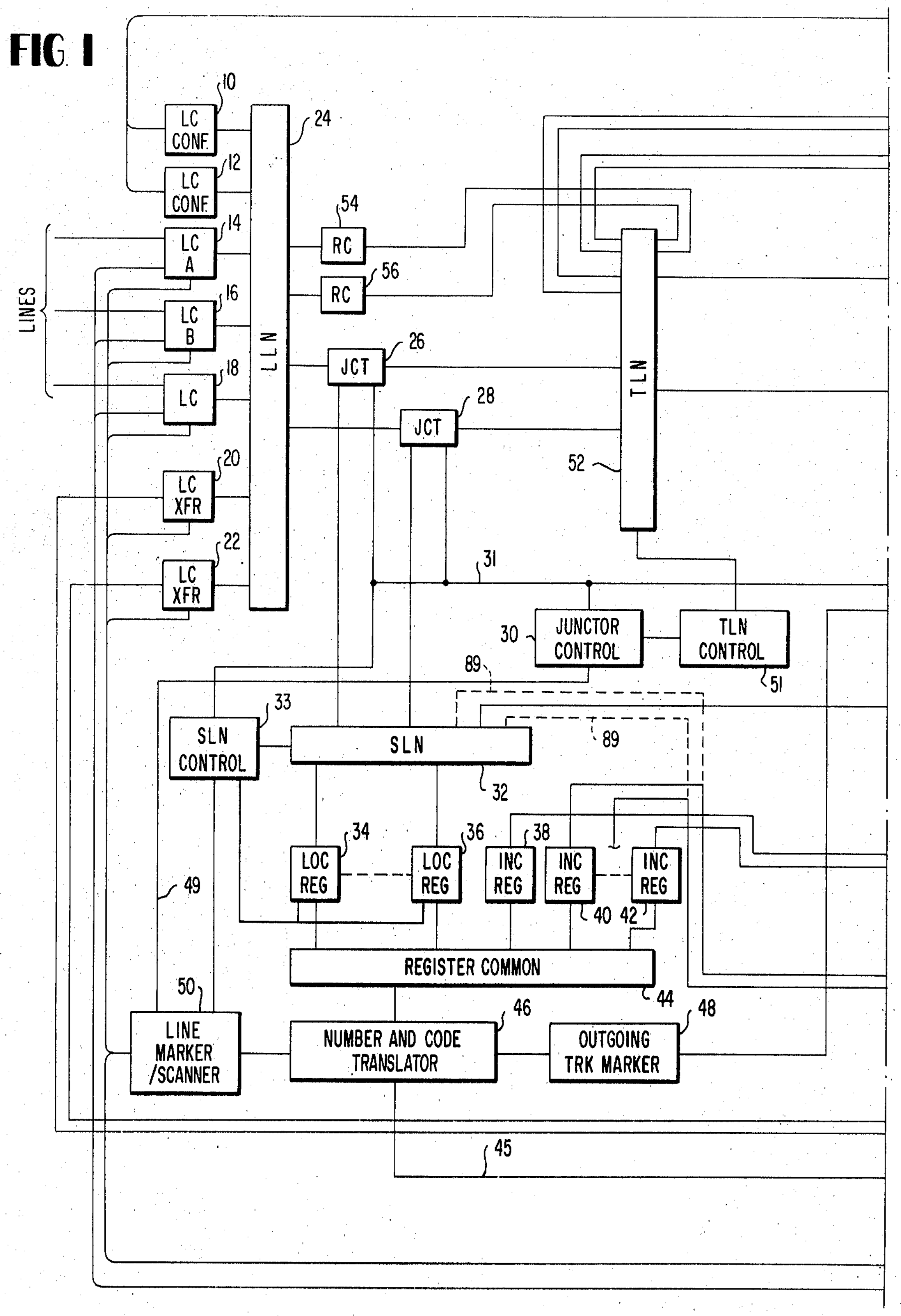

The invention relates in general to telephone systems, and more particularly to an electronic private automatic branch exchange system having a capacity for automatically processing calls in connection with a large, substantially unlimited, number of subscriber stations.

Prior to the development of automatic telephone systems, the private branch exchange system was controlled from one or more operator positions with all functions performed in the system, including switching between stations within the system, being performed at the switchboard by the operator. In such systems, an increase in the number of stations could be accommodated merely by adding one or more operator positions, the total number of which depended upon the traffic requirements of the system. Thus, presuming that all subscriber stations would not require service at one time, the number of operator positions necessary to handle the average flow of traffic within the PBX system during normal and peak periods determined the number of operators required at any one time. Of course, with such an arrangement, during unusually high traffic periods, the service provided by the system was apt to be less than satisfactory.

With the introduction of automatic telephone equipment, the need for an operator in a private branch exchange was reduced to the switching of calls from the outside world into a desired subscriber station and certain service functions, since the interconnections between subscriber stations within the exchange were now handled automatically by the system without need for the services of the operator. As a result, increases in the number of subscriber stations merely required an increase in the available automatic equipment, since a proportionate increase in the number of operators was no longer necessary with the reduction in the operator function. However, for various large facilities, the number of subscriber stations which could be accommodated by the private automatic branch exchange was necessarily limited by the complexity of the automatic switching equipment required to handle normal traffic conditions. Thus, for extremely large organizations, such as large business complexes or governmental facilities, the private automatic branch exchanges developed to date have been too limited in size to provide the necessary number of subscriber stations and the automatic features necessary to accommodate the communication requirements of the organization.

It is therefore an object of the present invention to provide a private automatic branch exchange which is capable of accommodating a substantially unlimited number of subscriber stations.

It is another object of the present invention to provide a private automatic branch exchange of extremely large size which is capable of handling communication connections between subscriber stations, the outside world and the operator positions at high speed.

It is a further object of the present invention to provide a private automatic branch exchange of substantially unlimited size which is capable of providing a plurality of automatic features, such as direct inward dialing, call transfer, camp on, multi-party conference, and message-waiting-and-do-no-disturb.

It is still another object of the present invention to provide a private automatic branch exchange of substantially unlimited size which is versatile, high speed, and capable of providing a plurality of special service functions on a selective basis for the large number of subscriber stations serviced.

In accordance with the present invention, the characteristic equipment of a private automatic branch exchange is combined with the switching equipment of a central office to provide an exchange of substantially unlimited size. The central office portion of the equipment is provided in the form of an electronic switching central having a line link network for selectively connecting one of a plurality of subscriber stations via a junctor circuit and service link network to one of a plurality of local registers. A trunk link network is also provided for effecting termination of the calls from the junctor circuits back through the line link network to a terminating subscriber or out through trunk circuits to the outside world. A line scanner and marker, outgoing trunk marker, number translator, and junctor control normally provided with the electronic switching central serve to provide the necessary marking of line circuits and trunks in accordance with the dialed information received by the translator via the registers and control the necessary interconnection of the parties.

The private automatic branch exchange portion of the system includes an operator service link network through which different type trunk circuits are connected to various service circuits which permit the specialized features normally found in a branch exchange to be performed. For instance, an operator console is accessed from an incoming/outgoing attendant, or access trunk through a position circuit associated with the console of one of a plurality of loop circuits associated with the position circuit. The operator service link network also effects the necessary connection of the universal trunks through an available dial pulse acceptor to an incoming register in the case of direct inward dialed calls and also provides connection to a plurality of transfer circuits which make possible an automatic transfer of parties within the system in response to an appropriate request by a party having the proper class of service.

Since the system of the present invention essentially comprises the marriage of a central office, which operates on a fully automatic basis in response to detected conditions, and a private branch exchange which requires the services of the operator for many functions, a particularly important feature of the present invention resides in the automatic transfer of data concerning the parties of any call which requires the services of one of the trunks in the system from the electronic switching central portion of the system of the PABX portion of the system. Thus, in all cases where the call requires, or might at some later time require, the services of the operator, i.e., all calls which are associated with any of the trunk circuits in the system, the calling and called directory numbers, class of service information and other data which might be required to control or inhibit certain functions associated with that call are automatically transferred from the electronic switching central portion of the system to the private branch exchange portion of the system, where it is stored for future use. This function occurs each time one of the trunk circuits is in any way connected to a subscriber station within the system and may also be stored for line to line calls.

Another advantageous feature of the present invention relates to the direct inward dialing feature of the system wherein calls from the outside world into an incoming/outgoing trunk are automatically switched through the operator service link network to an incoming register in the electronic switching central, which then automatically effects a connection of the trunk circuit to the required called party.

A further advantageous feature of the present invention relates to the call transfer function which is performed by the system wherein a subscriber station having the proper class of service can switch a call from the outside world to another line circuit automatically without the services of the operator. This call transfer operation can also be effected through the operator by those subscribers not having the proper class of service.

Figure 2:
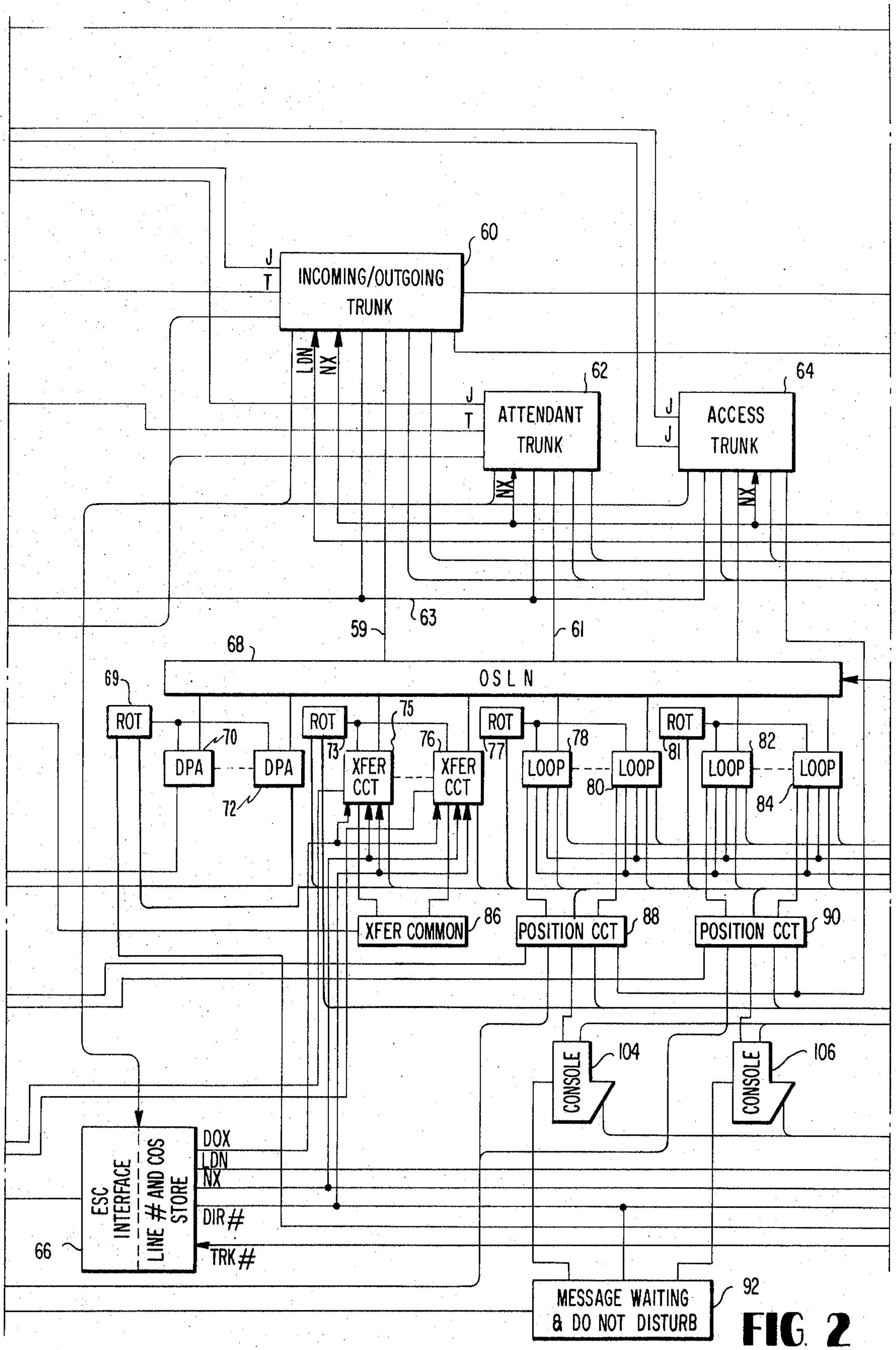
Figure 3:
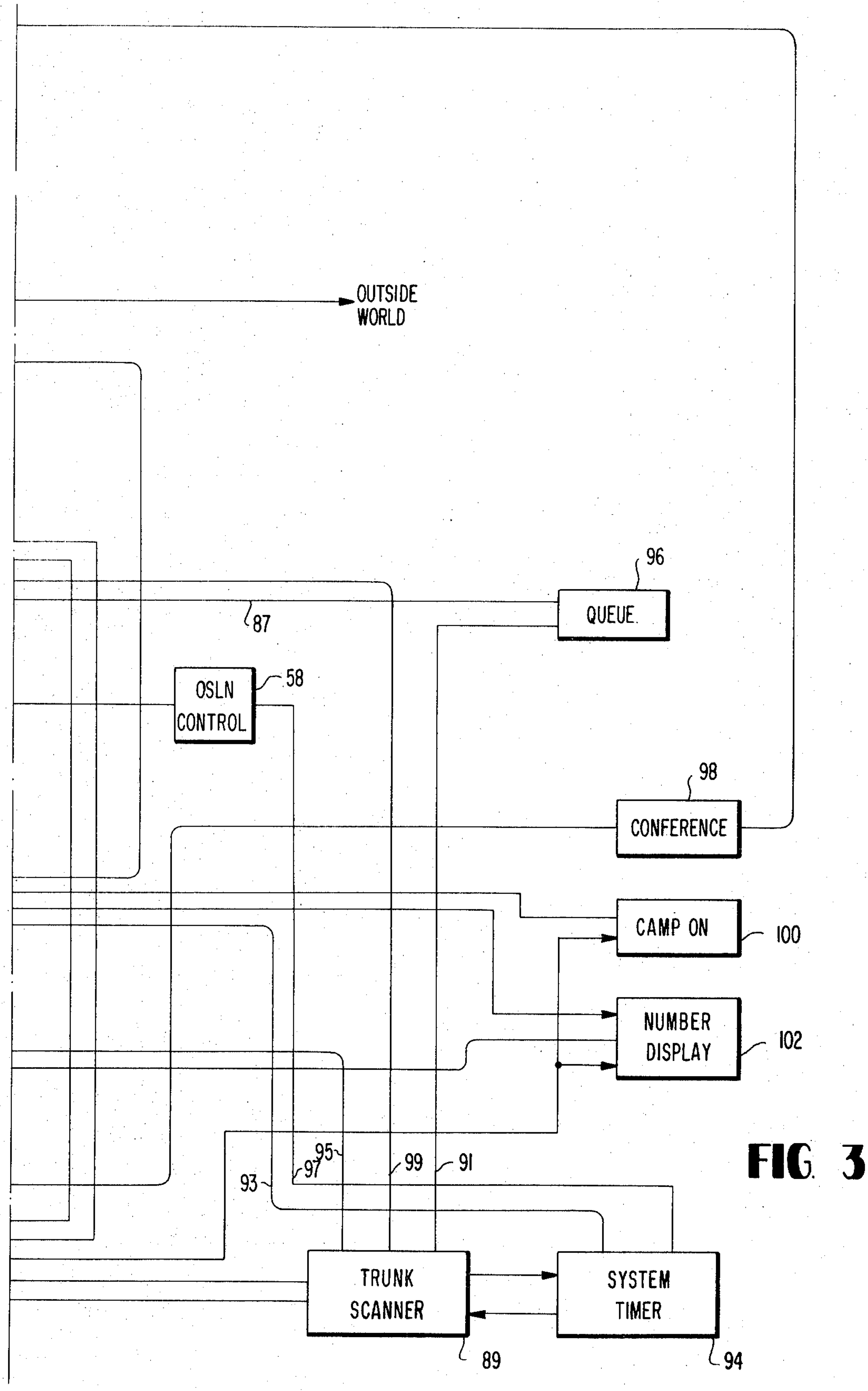
Figure 4:
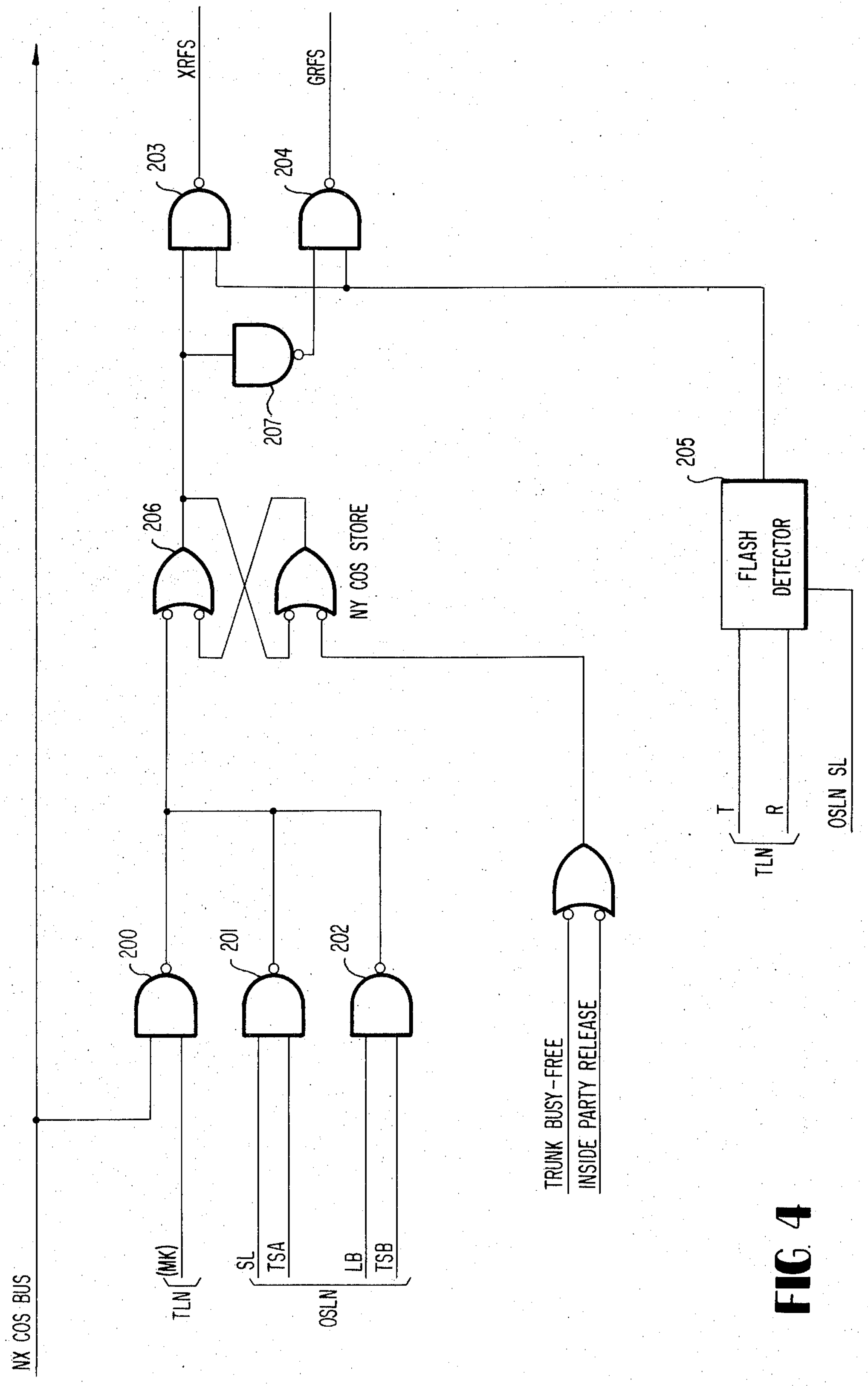

These and other objects, features and advantages of the present invention will become more apparent from the following detailed description thereof, when taken in conjunction with the accompanying drawings, which illustrate one exemplary embodiment of the present invention, and wherein FIGS. 1 – 3 when combined in numerical order provide a schematic block diagram of the present invention; and FIG. 4 is a schematic circuit diagram of a class of service circuit.

GENERAL SYSTEM DESCRIPTION

It will be seen from the drawings that FIG. 1 represents that portion of the system which relates to an electronic switching central; while, FIGS. 2 and 3 provide equipment which forms part of a private branch exchange. Thus, the most basic feature of the present invention, which provides for the combination of an electronic switching central with a private branch exchange, can be easily recognized from FIGS. 1 – 3.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN is connected to a plurality of line circuits such as the conference line circuits 10 and 12, typical subscriber line circuits 14, 16, 18, and transfer line circuits 20 and 22. The number of subscriber line circuits provided vary in number in dependence upon the telephone service to be offered, but may typically exceed 4,000 lines. The typical subscriber line circuits 14, 16, and 18 are more fully described in copending U.S. application Ser. No. 15,233, filed on June 15, 1971, now U.S. Pat. No. 3,708,627, issued Jan. 2, 1973, by Otto Altenburger, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path finding need be perfomed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 is more fully described in copending U.S. application Ser. No. 100,571, filed on Dec. 22, 1970, in the name of Otto Altenburger, now U.S. Pat. No. 3,705,268, issued Dec. 5, 1972, which is assigned to the same assignee as the present invention.

The junctors 26 and 28 serve as the focal points for all local originating traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off-hook condition and is used for both originating and terminating types of traffic. In the event of originating traffic, the line scanner stops when an off-hook condition is detected and transmits the information from its counter circuits to a marker circuit to mark the particular line circuit and enables the SLN control 33 to initiate a path finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through the junctor control 30 to the ringing control 34. The line scanner-marker circuit 50 is more fully described in copending U.S. application Ser. No. 101,091, filed on Dec. 23, 1970, in the names of Gunter Neumeier and Otto Altenburger, now U.S. Pat. No. 3,699,263, issued Oct. 17, 1972, which is assigned to the same assignee as the present invention.

The trunk link network (TLN) 52 provides for the termination of the local traffic to local subscribers, the termination of incoming calls from other exchanges to the local subscribers, and for the connection of incoming calls from other exchanges to other external exchanges. The TLN 52 includes a three-stage network. When further expansion is necessary, another stage can also be included. A D stage of the matrix is the entrance to the TLN and is connected to the local junctors 26 and 28. An F stages is the output or exit of the TLN and is connected via the ringing controls of the line link network 24 and also to the trunk circuits.

Path finding through the trunk link network 52 is performed under the control of the TLN control 51 and the junctor control 30. The TLN control 51 and the junctor control 30 work together in completing the termination portion of a call, whether it is an internally terminated call or an outgoing call to a distant office. The number and code translator 46 and line scanner-marker 50 are used to complete calls to local lines, and the number-code translator together with the outgoing trunk marker 48 complete calls to the trunks. The outgoing trunk marker is more fully disclosed in application Ser. No. 103,267, filed Dec. 31, 1970, in the names of Otto Altenburger and David Stoddard, now U.S. Pat. No. 3,732,377, issued May 18, 1973, and is assigned to the same assignee as the present application.

The path finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit. The path finding sequences through the SLN and the TLN along with the equipment associated therewith are more fully described in copending U.S. application Ser. No. 153,221, filed on June 15, 1971, in the names of Otto Altenburger and Robert Bansemir, now U.S. Pat. No. 3,708,627, issued Jan. 2, 1973, which is assigned to the same assignee as the present invention.

Looking now to the portion of the system illustrated in FIGS. 2 and 3, which includes the (PBX) private branch exchange portion, five types of trunk circuits may be provided in the telephone system of the present invention; however, only an incoming/outgoing trunk 60 providing direct inward and direct outward dialing, an attendant trunk 62, and access trunk 64 are illustrated. The access trunks 64 are used solely by the operators to originate calls to the subscriber stations; while, the attendant trunks 62 are used by the local stations for access to the operator, from which they can be extended to another trunk or local station. The incoming/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunks 62 and serves to select a trunk circuit for a call originated by one of the local subscribers in response to the dialed digits as analyzed by the number and code translator 46. The incoming/outgoing trunk circuits are disclosed more fully in our copending application Ser. No. 293,571, filed Sept. 29, 1972 now U.S. Pat No. 3,806,660, issued Apr. 23, 1974.

An operator service link network (OSLN) 68 controlled by an OSLN control 58 is provided for connecting the trunks 60, 62 and 64 to various service circuits such as the dial pulse acceptors 72–74, transfer circuits 74–76, and loop circuits 78-84. The operation of the OSLN 68 and the OSLN control 58 and the method of signaling through the OSLN is fully described in two copending U.S. Patent application entitled "Path Finding System," Ser. No. 92,593, filed Nov. 25, 1970, now U.S. Pat. No. 3,729,591, issued Apr. 24, 1973, and entitled, "Telephone Switching Network Signalling System," Ser. No. 92,588, filed on Nov. 25, 1970, now U.S. Pat. No. 3,707,140, issued Dec. 26, 1972, both of which applications are assigned to the same assignee as the present application. The loop circuits 78–84 are separated into two groups 78–80 and 82–84, the former being connected to an operator console 104 via a position circuit 88 and the latter being connected to another operator console 106 via a position circuit 90. The loop circuit group 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer forming part of the common control for the PBX portion of the system, and the position circuits also are directly connected to a dedicated incoming register, such as 40 and 42, associated with the register common 44 and number and code translator 46 in the ESC portion of the system. If it is not desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The connection of any trunks to any service circuit group is fully disclosed in our copending U.S. Application entitled, "Private Automatic Branch Exchange Service Circuit Complex," Ser. No. 293,705, now U.S. Pat. No. 3,769,462, issued Oct. 3, 1973, while operation of the position and loop circuits is fully disclosed in a copending application entitled "Operator Loop Complex," Ser. No. 293,572, now U.S. Pat. No. 3,816,665, issued June 11, 1974, both of which are filed jointly herewith and are assigned to the assignee of the present application.

The incoming/outgoing trunk circuit 60 may also be connected through the OSLN to one of several dial pulse acceptors 72–74, which, although shown separately for convenience, form part of the dedicated incoming registers 38–40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunks 60 may also be connected through the OSLN 68 to transfer circuits such as 75–76, which are connected, respectively, to a dedicated transfer line circuit 20-22 at the input of the line link network 24. The transfer circuits are also preselected by a rotary 73 in preparation for a request for connection through the OSLN 68 to an incoming/outgoing trunk 60. The transfer operation includes the use of a transfer common 86 which is connected to the transfer circuits 75 and 76 and has a dedicated input to the service link network 32 for obtaining access to a local register 34 – 36. The transfer circuits and transfer common 86 are also connected to the system timer 94 and trunk scanner 89 via the rotary 73. The operation of the transfer circuit and transfer common is fully disclosed in a copending application entitled "Transfer Circuit", Ser. No. 293,681, now U.S. Pat. No. 3,806,661, issued Apr. 23, 1974, filed jointly herewith and assigned to the assignee of the present application.

A queue 96 is provided in association with the incoming/outgoing trunks 60 and attendant trunks 62 to provide for servicing of requests for the operator on a first come-first served basis. The operation of the queue 96 is fully described in our copending application entitled "Queue for Electronic Telephone Exchange," Ser. No. 108,380, filed Jan. 21, 1971, now U.S. Pat. No. 3,702,380, issued Nov. 7, 1972, which is assigned to the same assignee as the present application. The queue 96 is connected between each of the incoming/outgoing and attendant trunks and the trunk scanner 89 and serves to forward the trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to access an operator, a request for a transfer circuit, or the request for a DPA in connection with a direct inward dialed call. If a requested service circuit is available when the request is received in the trunk scanner 89, a stop scan signal will be generated and the request for service signal will be forwarded to the service circuit.

The system timer 94 scans each of the operator position circuits and transfer circuits in sequential order simultaneously with the more rapid scanning of the dial pulse acceptors 70 and 72. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected.

The system in accordance with the present invention also provides for various special features circuits including a message-waiting-and-do-not-disturb system 92, a conference system 98, and a camp-on system 100. The camp-on system is disclosed in our U.S. Pat. Nos. 3,676,606 and 3,679,835, both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information concerning the communication connection, such as the calling and called line circuit directory numbers, the class of service of the various parties involved and the numbers of the trunks which may be involved in the call. This type of information is not retained by the ESC portion of the system once the connection through that portion of the system is completed and so the present invention provides a PBX-ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection to a subscriber station, the data concerning the subscriber station, including the directory number and class of service thereof, will be forwarded via line 45 to the PBX-ESC interface and line number store 66 for storage therein or for transfer into the trunk circuit itself. For example, the transfer class of service will be forwarded to the trunk circuit upon connection thereof to the subscriber station by enabling the NX data bus from the store 66 each time a connection to a trunk is effected. In conjunction with the message-waiting-and-do-not-disturb function performed by the circuit 92, the ESC will pause prior to completing a connection to any line circuit to request of the message-waiting-and-do-not-disturb circuit 92 whether that line circuit may be in a do-not-disturb status. Signaling concerning dialed information from the number and code translator 46 and the PBX portion of the system is also effected through the PBX-ESC interface 66, such as signaling in connection with the dialing from the outside world of the listed directory number of the system by enabling the LDN lead or dialing by an inside subscriber of "0" on a transfer operation by enabling the DOX lead.

The purpose of the (NX COS) store 206 in the incoming/outgoing trunk 60 is to control whether a transfer request (XRFS) or a general request (QRFS) is generated when a subscriber hook flash is detected by the detector. If set, an XRFS is generated, if reset, a QRFS is generated. This store may be set by any of three means:

1. When a call is being extended to or from an incoming/outgoing trunk 60 to a subscriber having a notransfer class of service, the system marks the NX COS but at the time of the connection. Only this trunk may interrogate the NX COS bus at this time due to the TLN mark signal MK applied to the gate 200 which in turn sets the NX COS flip-flop 206, 2. If a call is being extended to this incoming/outgoing trunk 60 in an outgoing mode from an access trunk 64 or an attendant trunk 62 by the operator for a subscriber having a notransfer class of service (which the class of service was stored in the extending trunk at the time the subscriber was connected to that trunk) the NX COS flip-flop 206 is set by way of gate 201. The gate 201 is enabled by time slot TSA being extended over the holding sleeve through the OSLN from the extending trunk at the time of connection, and 3. If this incoming/outgoing trunk 60 is connected to a transfer circuit 74 and 76 via the OSLN (the inside party and outside party having already been connected) and the inside party has called another inside party having no transfer class of service via the transfer circuit, the NX COS data will be stored in transfer circuit at the time of connection. When the transfer circuit subsequently releases, the party connected to the transfer circuit 74 and 76 is now connected to the incoming/outgoing trunk 60 via the transfer reroute process. The NX COS data which was stored in the transfer circuit for that party is extended to the incoming/outgoing trunk at the time of release, this is detected by gate 202 which is enabled by time slot TSB. Once set, the NX COS flip-flop 206 may be reset by only two methods:

1. if the trunk becomes idle, that is, all connections have been released, or 2. the inside party disconnects or is forcibly disconnected from the trunk.

As long as the NX COS flip-flop 206 is reset, gate 203 (XRFS) is enabled by the flash detector 205 and gate 204 (QRFS) is inhibited. If a DOX signal is received indicating the operator has been dialed, the gate 203 is inhibited and the gate 204 is enabled to generate the general request QRFS. If the flip-flop 206 is set, the gate 203 is inhibited and the gate 204 is enabled. If the flip-flop 206 is reset the converse is true. The flash detector 205 constantly monitors the tip/ring pair of the inside party. If a momentary open on the pair is detected which is greater than 200 milliseconds but less than 2 seconds the flash detector 205 will generate a flash detected output to enable the appropriate gate 203 or 204. This flash detector will remain in the ON mode until either the OSLN sleeve is detected or the trunk becomes idle. A holding sleeve signal from the OSLN indicates that the appropriate service circuit has been connected to the other side of the OSLN matrix.

The operation of the system illustrated by way of example in FIGS. 1 – 3 will now be described with reference to various connections between the line circuits, outside world and operator positions and certain special features, including the transfer operation.

STATION-TO-STATION CALL

The basic call within the system will be the station-to-station call which is handled automatically by the ESC portion of the system. When party A, having line circuit 14, for example, goes off hook, the line marker and scanner 50, which is continuously scanning the line circuits to detect all requests for service, will detect the off-hook condition in the line circuit. The line scanner 50 then actuates the junctor control 30 via line 49 requesting the services of one of the junctors to connect the line circuit 14 to an available local register. The line circuit 14 is marked by the line marker and scanner 50. The SLN control 33 selects a local register, and path finding through the service link network 32 the junctors 26 and 28 and the LLN 24 effects connection of the selected junctor to the selected local register. The line circuit 14 is then connected through the line link network 24, an available junctor 26, service link network 32 and an available local register 34, for example.

Dial tone is returned from the local register to the line circuit 14 and party A commences to dial the number of the called party. The dialed digits are received in the local register 34 and are immediately passed on through the register common 44 to the number and code translator 46, which determines whether the call is to be extended to a station within the system or to the outside world. In the case of the present example, the call is to be extended to a station within the system, and so the number and code translator 46, upon determining the called line circuit identification, actuates the line marker and scanner 50 to effect a busy/free check of the called line circuit, and if free, marks the line circuit 16, for example.

At this point, a switch mark is extended from the local register 34 to the junctor to request the services of the junctor control 30. The junctor control 30 marks the trunk line network via the junctor and path finding through the trunk link network from the selected junctor 26 to the marked line circuit 16 through the ringing control 56, for example, is effected by the TLN control 51, thereby providing ringing to the called line circuit and ring-back to the calling line circuit. When party B answers, the parties are automatically interconnected and the service equipment, including the junctor control, TLN control, and local register, releases.

The connection between subscriber stations within the system is automatically effected entirely within the ESC equipment. However, data concerning this call is transferred to the ESC interface 66 for use if required.

STATION-TO-OUTSIDE WORLD

As in the conventional PBX system, a call to the outside world is initiated by dialing some access code thereby informing the system that an outgoing trunk is required. When party A goes off hook, line circuit 14 is connected to a local register 34, for example, through the line link network 24, junctor 26 and service link network 32 under control of the junctor control 30 and SLN control 33 in the manner described for a station-to-station connection. Dial tone is returned from the local register 34 to the line circuit 14 and party A commences to dial the access code such as digit "9," which is detected by the translator. Depending upon the requirement of the distant central office, the access code may affect switch through to the distant office, or may program the register for outpulsing in which case second dial tone is returned from the register and all digits are to be dialed before switch through is accomplished.

After all digits have been dialed by party A, the register extends a switch mark to the junctor which accesses the junctor control 30. The translator 46 accesses the outgoing trunk marker 48 which performs a busy/free check of the incoming/outgoing trunks 60 and extends a mark to the trunk output of an available incoming-/outgoing trunk 60. The trunk link network is then marked on one side from the trunk output of the incoming/outgoing trunk 60 from the outgoing trunk marker 48 and on the other side via the junctor 26 under control of the junctor control 30. Path finding through the trunk line network 52 under control of the TLN control 51 then establishes a connection from the line circuit 14 through the line link network 24, junctor 26, and trunk link network 52 to the incoming/outgoing trunk 60. The local register 34 then outpulses the dialed digits to the trunk when dial tone, wink start or removal of stop dial is detected.

Once the line circuit 14 is connected to the incoming/outgoing trunk 60 the common control equipment, such as the junctor control 30, local register 34, SLN control 33 and TLN control 51 releases since it is no longer needed to maintain the connection through the line link network 24 and trunk link network 52. However, since it may be necessary for the PBX portion of the system to perform various functions for this connection through the ESC which might require knowledge of the calling party directory number and class of service, at the time the trunk is marked from the outgoing trunk marker the pertinent data relating to the connection, such as the calling party directory number, class of service and the availability of the transfer function to that line circuit, are forwarded from the number and code translator 46 to ESC interface and store 66 where it is retained for further use by the PBX portion of the system. This transfer of data from the PBX interface to the ESC interface will occur each time a connection is established from the ESC to an incoming-/outgoing trunk 60, an attendant trunk 62, or an access trunk 64.

Once the connection is established from the line circuit 14 to the incoming/outgoing trunk 60 and the dialed digits have been outpulsed from the local register 34 to the incoming/outgoing trunk 60, the call to the outside world is established in the conventional manner. When the call is completed, the release of either party will result in the release of the incoming/outgoing trunk 60 which causes the switch train through the trunk line network 52 and line link network 24 to release.

LINE-TO-OPERATOR POSITION

As in the conventional system, if a party desires communication with the operator, the digit "0" is dialed or keyed. This digit which indicates a request for the operator is detected in the number and code translator 46 after receipt in the local register 34, for example, and the translator 46 accesses the outgoing trunk marker 48 to mark an available attendant trunk 62 at the trunk output thereof. At the same time, a switch mark is extended from the register 34 to the junctor 26, for example, which accesses the junctor control 30 so that a mark is extended from the junctor to the trunk link network 52. Path finding through the trunk link network 52 is commenced under control of the TLN control 51 and the line circuit 14 is connected via the line link network 24, junctor 26, and trunk link network 52 to the attendant trunk 62.

As indicated above, at the time the trunk 62 is marked from the outgoing trunk marker 48, the translator forwards the calling party director number, class of service and transfer data through to the ESC interface and store 66. If party A associated with the line circuit 14 does not have transfer service available, the NX bus from the ESC interface and store 66 will be enabled to store this data in the attendant trunk 62. Thus, if party A attempts to initiate a transfer operation after the junctor extends the call to the outside world, the NX data stored in the attendant trunk 62 will inhibit the attempt at transfer.

When the line circuit has been connected to the attendant trunk 62, the identifying number of the attendant trunk 62 is transferred into the queue 96 where the trunk numbers are stored in the order of receipt. When the trunk scanner 89, which continuously scans all of the incoming/outgoing trunks 60, attendant trunks 62, and access trunks 64, accesses the selected attendant trunk 62, a QRFS signal will be transferred from the attendant trunk to the queue 96 and the number of the attendant trunk 62 received from the trunk scanner 89 will be compared to the trunk number at the output of the queue 96 to determine whether that particular trunk is to be serviced next in the order of priority. If the number transmitted from the trunk scanner 89 corresponds to the number at the output of the queue 96, the queue 96 will generate a GRFS signal which is transmitted to the trunk scanner 89.

The trunk scanner 89 monitors the busy/free condition of the position circuits at all times. The position busy condition can be effected by any of several reasons such as position busy key operated, night key operated, operator busy in call, answering incoming trunk call on trunk and all loops busy. All loops busy condition is effected by the rotaries which selectively connect an available loop circuit to the associated position circuit. As soon as a loop is busy, the rotary immediately steps to the next available loop so that a loop is always preselected for connection to a requesting trunk circuit. Thus, if the rotary is continuously running, it is an indication that the loops associated therewith are all busy, but if the rotary is stationary, it is an indication that a loop is preselected and available.

An indication from the position circuits to the trunk scanner 89 that at least one position is available in conjunction with receipt of a GRFS signal from the queue 96 will result in the GRFS signal being passed on from the trunk scanner 89 from the bus 93 to all of the position circuits as an RFSGS signal. The first position circuit having an available loop and is subsequently scanned by the system timer 94 will then pass the RFSGS signal on as a mark through the loop to the operator service link network 68. As soon as the attendant trunk 62 is scanned by the trunk scanner 89, it also applies a mark on line 61 to the operator service link network 68, so that the marking of the OSLN from each side will result in a connection of the attendant trunks 62 to the selected position circuit 88 through an available loop 78, for example, upon completion of the path finding operation. The links in the OSLN are scanned automatically during the first 16-microsecond period of every operator time slot whether or not a GRFS signal is generated. Thus, with the mark extended to one side of the OSLN from the trunk and to the other side thereof from the operator's loop, the loop will be connected to the calling trunk during the particular operator's time slot. Once the call is in the loop, the loop will signal the operator at the operator's console 104, for example, and the operator may connect to the trunk by depressing the associated loop key on the console. As soon as the operator is connected to the attendant trunk 62, the trunk scanner 89 releases and begins its scan of the other trunks and another free loop associated with the position circuit is preselected by the rotary.

Once a party is connected via its line circuit to the operator, the operator may switch that line to another party within the system or to the outside world.

STATION-TO-STATION VIA OPERATOR

Once a party has been connected to the operator and requests connection to another station within the system, the operator depresses a register key to access one of the registers, such as registers 40 and 42, which are reserved for use by the position circuits. If, on the other hand, the position circuit is connected to the SLN 32, any of the local registers 34 and 36 will be accessed. Dial tone is then received from the register, for example, and the operator dials the number of the called party to which a connection is to be established. After the last digit is dialed, the register forwards a switch mark to the attendant trunk 62 via the position circuit and loop through the OSLN to mark the junctor output of the trunk. At this time, the attendant trunk 62 accesses the junctor control 30 via the bus 63.

The translator responds to receipt of the dialed digits by accessing the line marker and scanner 50 which marks the appropriate line circuit after a busy/free check has been made. Thus, the trunk link network 52 is marked from the junctor appearance of the attendant trunk 62 on one side and by the line marker via the line circuit, line link network and ringing control on the other side. The path finding operation is begun and a path is switched through to establish a connection between the operator via the junctor output of the attendant trunk 62 to the called line circuit and via the trunk output of the attendant trunk 62 to the calling line circuit. All three parties are now connected together and may converse with one another.

The manner in which the operator releases from the loop determines whether the call will be locked in the loop (locked loop operation), or will be released from the loop (non-locked loop operation) wherein the supervision of the call is handled therefor by the trunk circuit in the usual manner. In the locked loop operation the calling and called parties will remain connected together in the loop circuit via the attendant trunk 62. Release by either the calling or called party will only release the corresponding position of the connection while the other party will remain connected to the loop. The remaining party can hook flash for recall, in which case the operation can then establish another connection for that party. On the other hand, the remaining party may also release, causing the loop circuit to reassume the idle state.

STATION-TO-OUTSIDE WORLD VIA OPERATOR

When a party has been connected to the operator and has requested connection to the outside world, the operator presses a register key to access one of the available incoming registers. Dial tone is then received from the incoming register and the operator dials the digit "9." This digit is detected in the number and code translator 46 which instructs the register to return a second dial tone to the operator, who may then dial the seven or nine digits of the outside party.

When all of the digits have been dialed by the operator, the incoming register extends a switch mark via the position circuit, loop and OSLN to mark the junctor appearance of the attendant trunk 62 and signal the junctor control via the bus 63. The translator accesses the trunk marker to perform a busy/free check of the incoming/outgoing trunk circuits 60 and mark an available incoming/outgoing trunk at the trunk output thereof. Path finding through the trunk link network 52 then serves to connect the attendant trunk 62 in series with the available trunk 60. The register now outpulses the digits to the incoming/outgoing trunk when dial tone is detected and the call to the outside world is completed in the conventional manner. The operator can wait for the party to answer, and then has the option of a three-way conference, split or release.

At the time of connection of the calling party from the attendant trunk 62 through the OSLN, loop and position circuit to the operator, if the calling party does not have a transfer class of service available, the NX bus at the output of the ESC interface and store 66 is enabled so as to forward this NX data to the attendant trunk 62. The NX data is forwarded to the trunk circuit from the attendant trunk at the time the connection is being established. This is necessary since the attendent trunk will perform as a passive circuit in the connection once the operator releases, requiring the NX data to be stored in the incoming/outgoing trunk, which then takes over control of future operations in connection with that call.

OUTSIDE WORLD-TO-STATION

The system in accordance with the present invention permits the direct inward dialing (DID) of calls from the outside world to a station within the system. When the outside world seizes an incoming/outgoing trunk 60, the trunk generates an RRFS signal immediately on the common bus 99 to the trunk scanner 89 even if that particular incoming/outgoing trunk 60 is not being scanned by the trunk scanner 89 at that time. In view of the urgency in handling DID calls from the outside world on a priority basis, the system does not wait for a scanning of the particular incoming/outgoing trunk involved in the incoming call but operates immediately on the request for service by extending the RRFS signal to the trunk scanner 89, which will extend the request to the two dial pulse acceptors 70 and 72 as soon as the operator time slot presently occurring has been completed. At this time, the trunk scanner 89 inhibits the scanning of the loops and transfer circuits and provides a high speed scanning of the two dial pulse acceptors.

When an available dial pulse acceptor 70, for example, is scanned by the trunk scanner 89 in coincidence with the application of a register request signal RRSR thereto, the mark will be extended through the dial pulse acceptor to the input of the operator service link network OSLN. As soon as the incoming/outgoing trunk 60 is seized, it also applies a mark via line 59 to the other side of the operator service link network OSLN and path finding through that network will then establish a connection from the incoming/outgoing trunk to the dial pulse acceptor 70.

The incoming dialed digits from the outside world are applied through the incoming/outgoing trunk, the operator service link network OSLN and dial pulse acceptor to the incoming register connected thereto. At this time the trunk scanner 89 releases and continues its scanning of the other trunk circuits.

The number and code translator 46 analyzes the incoming dialed digits and accesses the line marker and scanner 50 to mark the designated line circuit if the busy/free check thereof indicates that the line circuit is available. The register 38 applies a switch mark via the dial pulse acceptor and operator service link network OSLN to the incoming/outgoing trunk to mark the junctor appearance. With the incoming/outgoing trunk 60 marked and the called line circuit marked, path finding through the trunk link network 52 establishes a connection from the outside world through the incoming/outgoing trunk 60, trunk link network 52, ringing control, line link network 24, and the called line circuit. Ringing is applied to the called line circuit from the ringing control and ring-back is applied back through the incoming/outgoing trunk to the outside world. When the called line circuit answers, ringing is tripped and the parties are interconnected. At this time, the common control equipment in the ESC, such as the junctor control 30 and incoming register 38, as well as the common control equipment in the PBX portion of the system, such as the dial pulse acceptor, are released. However, at the time the ESC portion of the system marks the incoming/outgoing trunk the called directory number and class of service as well as the NX data is transferred from the PBX interface 58 to the ESC interface and store 66, and the NX data is transferred up to the incoming/outgoing trunk 60, which will thereafter control requests for transfer.

OUTSIDE WORLD-TO-STATION VIA OPERATOR

When the outside world dials the listed directory number of the system, the call is to be extended to the operator; however, until the dialed digits can be analyzed by the number and code translator 46, the system cannot determine whether the call is a direct inward dialed call or a listed directory number call. Accordingly, when the outside world seizes the incoming/outgoing trunk 60, the trunk will be connected through the operator service link network 68 and an available dial pulse acceptor 70 to an available incoming register 38, for example, as indicated previously in connection with a direct inward dialed call (DID).

When the dialed digits have been received by the register 38 and analyzed by the number and code translator 46, the translator will signal the ESC interface 58 via line 45 to enable the LDN bus which then signals the incoming/outgoing trunk 60 that a listed directory number (LDN) has been dialed. The translator also causes the register 38 to extend a switch mark via the dial pulse acceptor 70 and operator service link network OSLN to the trunk 60.

The coincident receipt of the switch pulse and the marking of the LDN bus when detected in the incoming/outgoing trunk 60 prevents the trunk from accessing the junctor control and also causes a QRFS signal to be forwarded to the queue 96 when the incoming/outgoing trunk 60 is next scanned by the trunk scanner 89. The incoming/outgoing trunk 60 is then connected to an available operator through the operator service link network OSLN, an available loop and associated position circuit in a manner similar to that described for the connection of station-to-station calls via the operator. The operator then may connect the incoming line to one of the subscriber stations in the system or back to the outside world to another incoming/outgoing trunk 60. Where a connection is requested to one of the subscriber stations within the system, the operator merely depresses a register key which places the outside world on hold and accesses the incoming register dedicated to the particular operation position circuit. The connection to the subscriber station is then carried on in a manner similar to that described for the connection of station-to-station calls via the operator.

OPERATOR-TO-STATION

The operator may connect to one of the subscriber stations by pressing a loop key on the console, which extends a signal to the loop. If the loop is idle, the signal is returned to a key store in the position circuit. When the trunk scanner 89 steps to an available access trunk 64, an enable signal is extended to the key store via the operator service link network OSLN which generates an enable signal when the operator time slot appears from the system timer 94 on bus 93. The operator service link network OSLN is thus marked from the selected loop and from the available access trunk and path finding commences to connect the access trunk 64 through the loop and position circuit to the operator.

The operator then presses a register key to access the register associated with the position circuit and dial tone is returned to the operator from the incoming register. The operator then dials the digits of the subscriber line circuit. After the last digit is dialed, the register forwards a switch mark to the access trunk via the position circuit, loop and operator service link network marking one junctor appearance of the access trunk.

The number and code translator 46 signals the line marker and scanner 50 to mark the line circuit designated by the dialed digits received from the incoming register and the junctor control 30 is signaled from the access trunk to initiate path finding between the marked line circuit and the marked access trunk through the trunk link network 52. Ringing is applied from the loop to the called line circuit via the established connection and ring-back is applied to the operator. When the called party answers, the line circuit will be connected to the operator.

The operator may at this time connect the line which she has called to another line in the system or to the outside world. To connect the party to another party in the system, the operator once again presses a register key which accesses the register, returning dial tone to the operator so that she may dial the number of the second subscriber station. In response to receipt of the dialed digits, the system establishes a connection between the operator and the second junctor appearance of the access trunk 64 to the second called subscriber, which is then connected in a three-way conference with the first subscriber and the operator upon answering. The operator may then release leaving the two subscribers connected together through the access trunk 64 and loop circuit via the operator service link network OSLN in locked loop mode, or in a non-locked mode through the access trunk 64.

If the operator wishes to connect the called subscriber to an outside line, a register key is depressed obtaining access to the dedicated imcoming register and dial tone is received in the manner previously described. However, at this time the operator dials the same access code which is recognized by the number and code translator 46 as a request for an outside line and instructs the register to return a second dial tone to the operator. The operator then dials the seven or nine digit number designating the outside party. The register then applies a switch mark through the position circuit, loop and operator service link network OSLN to mark the second junctor appearance of the access trunk 64.

Upon receipt of all of the dialed digits, the number translator accesses the outgoing trunk marker 48 to select and mark the trunk output of an available incoming/outgoing trunk 60 which then signals the junctor control 30 to effect a connection through the trunk link network of the access trunk in series with the incoming/outgoing trunk, at which time the register outpulses the dialed digits to the incoming/outgoing trunk and releases.

As indicated in the operation for station-to-outside world via operator, when the operator is initially connected through the access trunk to the subscriber station an NX data signal is stored in the access trunk if the party has no transfer class of service available. Consequently, if the operator now extends the party to an outgoing trunk 60, the NX data is transferred to the outgoing trunk 60 which will thereafter prevent requests for transfer from being generated by that trunk.

RECALL FROM INCOMING/OUTGOING TRUNK (NO TRANSFER)

Once a connection has been established between a subscriber station and the outside world through an incoming/outgoing trunk 60 by any of the above-described operations, the subscriber station may initiate a transfer of the connection to the outside world to another subscriber station by a hook switch flash, if the subscriber station has the upper class of service; or, if the subscriber station does not have a transfer class of service, the operator may be summoned by a hook switch flash. As already indicated, each time a connection is made to an incoming/outgoing trunk, or any other trunk in the system, the NX data from the ESC interface and store 66 indicating whether the party has a transfer class of service available is stored in the trunk. Thus, when the incoming/outgoing trunk detects a hook switch flash from the subscriber station, depending upon whether or not the NX data stored in the trunk indicates that a transfer is available, the trunk will either initiate connection to an incoming register through the operator service link network OSLN and an available dial pulse acceptor or connect through the operator service link network OSLN and an available loop and position circuit to an operator.

Assuming a call has been established between party A having line circuit 14 and the outside world through an incoming/outgoing trunk 60 and further assuming that party A does not have a transfer class of service available, when party A flashes the hook switch the NX data stored in the trunk identifies the hook switch flash as a request for the operator. Accordingly, when the incoming/outgoing trunk is scanned by the trunk scanner 89, and QRFS signal is generated from the trunk and applied to the queue 96 along with the identification number of the trunk. The number at the output of the queue 96 is then compared with the number of the trunk being scanned, as provided by the trunk scanner 89, and if a correspondence is detected, the queue forwards a GRFS signal to the trunk scanner 89 to stop the scanner if an operator is available. If the queue is taken out of service, this fact is detected by all trunks so that request for operator service will result in generation of a GRFS directly by the trunks. A mark is then extended from the trunk scanner to the position circuits which are being scanned by the system timer and the first available loop applies the mark to the operator service link network OSLN. The OSLN is marked at the other side from the incoming/outgoing trunk via line 59 and a connection is then established between incoming/outgoing trunk and the operator through the OSLN, loop and position circuit to the operator.

Upon answering, the operator will be connected both to party A and the outside world and therefore will be capable of connecting these parties to a third party if desired, or party A may release and permit the operator to connect the outside world to another party in the manner already described above.

RECALL FROM INCOMING/OUTGOING TRUNK (TRANSFER)

As already indicated, once a connection is established between a subscriber station and the outside world, the subscriber can effect a transfer to a second subscriber station by flashing the hook switch if the transfer class of service is available to him. The transfer operation to a second subscriber station is carried on automatically without the services of the operator, as will be described below. Thus, once a connection has been established to the outside world, if the subscriber wishes to recall the operator, more than just a flash of the switch hook will be necessary.

Assuming that party A having line circuit 14 is connected to the outside world through an incoming/outgoing trunk 60 and further assuming that the party A has a transfer class of service available, as indicated by the NX data stored in the incoming/outgoing trunk 60, a recall to the operator is initiated by a flash of the switch hook. Since the NX data stored in the trunk indicates a transfer class of service is available, the trunk will generate an XRFS signal when it is next scanned by the trunk scanner 89, which signal will be applied directly on the bus 99 to the trunk scanner. Trunk scanning will be stopped at this point if a transfer circuit is available and a mark wil be extended from the trunk scanner through the transfer common 86 via bus 95 through the preselected transfer circuit 74, for example, to the operator service link network OSLN. The incoming/outgoing trunk 60 extends a mark on line 59 to the other side of the OSLN which then connects the trunk to the preselected transfer circuit 74.

Each transfer circuit is connected to a dedicated transfer line circuit connected at the input of the line link network 24. The transfer circuit places the outside world on hold and accesses its transfer line circuit to provide an off hook condition which can be detected by the line marker and scanner 50. The line marker and scanner 50 then actuates the junctor control, marks the line link network input from the transfer line circuit and actuates the SLN control 33 to select an available local register. The transfer line circuit 20 is then connected through the line link network 24, an available junctor 28 and the service link network 32 to an available local register 34, for example. The local register returns dial tone through the transfer line circuit 20, transfer circuit 74, operator service link network 68, incoming/outgoing trunk 60, trunk link network 52 and line link network 24 to line circuit 14 so that party A may dial the number of a second subscriber station to which connection is requested, or in the present case, may request connection to the operator.

Party A dials the digit "0" which is recognized by the number and code translator 46 as a request for the operator. The translator thus suppresses the generation of a switch mark in the register, which would normally be extended to the junctor and junctor control, and instead signals the ESC interface 66 via line 45 to generate a signal DOX indicating that the operator has been dialed on a transfer call. The ESC interface and store 66 marks the DOX bus which forwards the request via the transfer circuit to the incoming/outgoing trunk through the OSLN.

Receipt of the DOX indication in the incoming/outgoing trunk inhibits the XRFS signal and causes the generation of a QRFS signal which is forwarded to the queue along with the identity of the incoming/outgoing trunk. The system then proceeds to establish an connection from the incoming/outgoing trunk through the operator service link network OSLN to an available loop and position circuit to obtain the services of an operator in the manner described previously.

AUTOMATIC TRANSFER

As indicated in the foregoing operation for recall with transfer, once party A having line circuit 14 is connected to a local register 34 through an incoming/outgoing trunk 60, operator service link network 68, transfer circuit 74, transfer line circuit 20, line link network 24, junctor 28, and service link network 32 as a result of a switch hook flash, dial tone is returned to party A from the local register 34 enabling the dialing of a second subscriber station. Assume party A having line circuit 14 dials the number of party B having line circuit 16. The dialed digits are received in the local register 34 and analyzed by the number and code translator 46, which accesses the line marker and scanner 50 to mark the line circuit 16. A switch mark is also extended from the register to the junctor to access the junctor control, which marks the trunk link network. Path finding through the trunk link network 52 then establishes a connection from party A having line circuit 14 through the line link network 24, junctor 26, trunk link network 52, incoming/outgoing trunk 60, operator service link network 68, transfer circuit 74, transfer line circuit 20, line link network 24, junctor 28, trunk link network 52, ringing control 56, and line link network 24 to line circuit 16 and party B, for example. Ringing is then extended from the ringing control to party B and ring-back is extended to party A.

If party B does not answer, party A may flash the switch hook a second time which is detected on this occasion in the transfer circuit and causes release of the transfer circuit and all of the ESC elements connected thereto. Under these conditions, party A will then be again connected solely to the outside world through the incoming/outgoing trunk 60.

If party A releases before party B answers, the outside world is released from hold by the transfer circuit and receives ring-back from the ringing control. The transfer circuit starts a time-out which will automatically connect the outside world to the operator if the party B does not answer within a prescribed time. Once the time-out signal has been generated indicating that the prescribed time has elapsed, this signal will access the incoming/outgoing trunk 60 and cause a QRFS signal to be generated in the trunk initiating the connection of the trunk to an available operator so that the operator may handle any further requests from the outside world for service. On the other hand, if the party B answers before the time-out signal is generated, the parties will be connected and a rerouting of the connection will be automatically initiated in a manner to be described below.

If party A does not release before party B answers, parties A and B will be connected for communication while the outside world remains on hold from the transfer circuit. Under these conditions, party A may flash the hook switch which will cause release of the hold in the transfer circuit and place the three parties in a conference connection. At this point, if party B releases, the transfer circuit will release along with the ESC equipment associated therewith so that party A will remain connected to the outside world solely through the incoming/outgoing trunk. On the other hand, if party A releases, party B will be connected to the outside world through the transfer circuit and a rerouting of the connection will be automatically initiated in a manner to be described below.

REROUTING-TRANSFER COMPLETE

The parties A and B having line circuits 14 and 16, respectively, may be in a three-way conference with the outside world, or the outside world may still be on hold with parties A and B connected together as a result of a transfer operation. Under these circumstances, party A is connected from line circuit 14 through the line link network 24, junctor 26, trunk link network 52, incoming/outgoing trunk 60, operator service link network 68, transfer circuit 74, transfer line circuit 20, line link network 24, junctor 28, trunk link network 52, and line link network 24 to the line circuit 16, for example. As is quite apparent, if party A releases at this point, party B will be connected to the outside world through the incoming/outgoing trunk 60 via a rather roundabout path including a number of pieces of equipment rather than the more direct path through a single junctor and the trunk link network 52. Accordingly, the system in accordance with the present invention under these circumstances initiates an automatic rerouting of the connection to establish a parallel connection from the line circuit 16 through an available junctor and the trunk link network 52 to the incoming-/outgoing trunk 60 so as to permit release of the more roundabout path through the transfer circuit When party A releases under the conditions set forth above, the release is detected in the transfer circuit which automatically releases the hold on the outside world if that condition still exists. The transfer circuit then extends a release signal through the connection to release party A and the switch train to line circuit 14. An RFS signal is also extended from the transfer circuit to the transfer common 86 to acquire the services of that circuit. The transfer common 86 has a direct appearance at the input of the service link network 32 so as to provide for connection to a local register. The transfer common receives the called line number which was stored in the transfer circuit at the time of the marking operation for the original transfer connection and outpulses this number to the local register through the service link network 32. The number and code translator 46 then extends the directory number designated by the outpulsed digits via line 45 to ESC interface and store 66 back to the transfer common where the number is compared to the number being outpulsed to ensure that the correct number is being switched.

If the comparison made in the transfer common proves that the correct line is being switched, the number and code translator 46 under control of the transfer common causes the line marker and scanner 50 to enter a forced marking mode of the busy party B to override the normal busy condition of the line circuit 16 and mark the line circuit appearance at the line link network 24. At the same time, the local register extends a mark through the transfer common 86, transfer circuit 74 and operator service link network 68 to mark the junctor output of the incoming/outgoing trunk 60. Premature ring tip of the ringing control associated with the connection is also effected to prevent a ringing of the parties. Path finding through the trunk link network 52 then effects a connection between line circuit 16 and the incoming/outgoing trunk 60 to the outside world, which path is in parallel to the previous path extending from the line circuit 16 through the transfer circuit to the incoming/outgoing trunk 60. Once the parallel path has been established, the switch mark extending from the register ends and the transfer circuit along with the transfer common and associated ESC equipment releases.

It should be noted in connection with this operation that the original path from the line circuit 16 through the transfer circuit and incoming/outgoing trunk to the outside world is maintained during the entire rerouting operation so that communication between the parties is not interrupted. It is only after the second parallel path has been established that the original path is released so that no interruption of the communication between the parties is possible. Indeed, for a short period of time communication between the parties is effected over both of the parallel paths.

As indicated in the foregoing descriptions of the various operations performed by the system of the present invention, each time access to an operator position circuit is requested from one of the incoming/outgoing trunks or attendant trunks, a QRFS signal is generated and extended to the queue along with the identifying number of the trunk which is stored in the sequence of receipt in the queue. In this way, the trunks are not serviced in the order in which they are scanned, but are serviced in the order in which the requests for access to the operator are received. In a system having an extremely large number of trunks, this arrangement prevents a trunk which is positioned at the last part of the scanning sequence from having to wait an unnecessary length of time while trunks prior to that in the scanning sequence are serviced. However, should it be desired not to provide a queue in the system, the request for operator service from the trunks can be extended directly in the form of a GRFS signal on bus 99 to the trunk scanner 89, in which case the trunks will be serviced in the order in which they are scanned. The same is true if the queue should become disabled for any reason.

It should also be noted that various permutations of portions of the above-described operations can be effected by the system in a manner which should be obvious from this disclosure. Thus, consecutive transfer operations by parties having the proper class of service, which operations may also include the services of the operator, are possible.

What is claimed is:

1. A private automatic branch exchange for servicing a large number of subscriber stations comprising a plurality of subscriber line circuits, a plurality of local registers capable of storing and analyzing digit signals, a line link network providing a concentrator for originating connections and a fan-out for terminating connections, a service link network, a plurality of junctors, common control means for connecting a line circuit via said line link network, a junctor and said service link network to a selected local register, a plurality of ringing controls connected to said line link network for selective connection to a line circuit, a plurality of trunk circuits, a trunk link network responsive to said common control means for connecting said junctors to said ringing controls or to said trunk circuits, a plurality of operator position circuits, an operator console connected to each operator position circuit, and an operator service link network responsive to said common control means for selectively connecting said operator position circuits to said trunk circuits.

2. A private automatic branch exchange defined in claim 1, wherein said common control means includes a translator connected to said local registers and storage means connected to said translator and said trunk circuits for storing trunk identification data and class-of-service data relating to selected line circuits for the duration of a call involving said circuits.

3. A private automatic branch exchange as defined in claim 2, further including a plurality of loop circuits associated in groups with each operator position circuit for connecting said position circuit through said operator service link network to a selected trunk circuit.

4. A private automatic branch exchange as defined in claim 3, further including a plurality of dial pulse acceptors connected to said operator service link network for connection to one of said trunk circuits and a plurality of incoming registers each connected directly to a selected one of said dial pulse acceptors and to said translator for storing and analyzing digit signals received from outside the exchange.

5. A private automatic branch exchange as defined in claim 3, further including a plurality of transfer line circuits connected to the input of said line link network and a plurality of transfer circuits connected on the operator side of said operator service link network for effecting connection of a selected trunk circuit to one of said transfer line circuits so as to pass digit signals from said trunk circuit via said operator service link network through said transfer line circuit, said line link network, a junctor, and said service link network to a local register circuit and to thereby establish a transfer communication path.

6. A private automatic branch exchange as defined in claim 5, further including a transfer common circuit connected to all of said transfer circuits and having a direct connection to the input of said service link network for initiating a direct connection between a trunk circuit connected to a transfer circuit and a given local line circuit through said trunk link network and said line link network.

7. A private automatic branch exchange as defined in claim 5, further including transfer common means having a direct connection between said transfer circuits and the input of said service link network for establishing an additional communication path in parallel with said transfer communication path directly from said trunk circuit through said trunk link network and said line link network.

8. A private automatic branch exchange as defined in claim 1, further including a plurality of loop circuits associated in groups with each operator position circuit for connecting said position circuit through said operator service link network to a selected trunk circuit.

9. A private automatic branch exchange as defined in claim 1, further including a plurality of transfer line circuits connected to the input of said line link network and a plurality of transfer circuits connected on the operator side of said operator service link network for effecting connection of a selected trunk circuit to one of said transfer line circuits so as to pass digit signals from said trunk circuit via said operator service link network through said transfer line circuit, said line link network, a junctor, and said service link network to a local register circuit and to thereby establish a transfer communication path.

10. A private automatic branch exchange as defined in claim 9, further including a transfer common circuit connected to all of said transfer circuits and having a direct connection to the input of said service link network for initiating a direct connection between a trunk circuit connected to a transfer circuit and a given local line circuit through said trunk link network and said line link network.

11. A private automatic branch exchange as defined in claim 9, further including transfer common means having a direct connection between said transfer circuits and the input of said service link network for establishing an additional communication path in parallel with said transfer communication path directly from said trunk circuit through said trunk link network and said line link network.

12. A private automatic branch exchange for servicing a large number of subscriber stations comprising a plurality of subscriber line circuits, a plurality of local registers capable of storing and analyzing digit signals, a line link network, a service link network, a plurality of junctors, a line marker and scanner circuit for scanning said line circuits for request for service, a junctor control responsive to said line marker and scanner circuit for effecting connection of a line circuit through said line link network to an available junctor, a service link network control responsive to said line marker and scanner circuit for effecting connection of a junctor through said service link network to an available local register, a trunk link network, a plurality of trunk circuits, a trunk link network control responsive to said junctor control for connecting a junctor through said trunk link network and said line link network to a subscriber line circuit or through said trunk link network to a trunk circuit, a plurality of operator position circuits, an operator console connected to each operator position circuit, and common control means for connecting said operator position circuits to said trunk circuits through said operator service link network.

13. A private automatic branch exchange as defined in claim 12 wherein said trunk circuits include a plurality of incoming/outgoing trunks for connecting subscriber line circuits to the outside world, a plurality of attendant trunks of connecting a subscriber line circuit to an operator position circuit and a plurality of access trunks for connecting an operator position circuit to a subscriber line circuit.

14. A private automatic branch exchange as defined in claim 13, further including an outgoing trunk marker for marking selected incoming/outgoing and attendant trunks, and a translator connected to said local registers for translating said analyzed digit signals and actuating said line marker and scanner circuit and said outgoing trunk marker for marking operations.

15. A private automatic branch exchange as defined in claim 14, further including a plurality of loop circuits associated in groups with each operator position circuit and individually connecting said position circuit to said operator service link network.

16. A private automatic branch exchange as defined in claim 14, including storage means connected to said translator and said trunk circuits for storing trunk identification data and class-of-service data relating to selected line circuits for the duration of a call involving said circuits.

17. A private automatic branch exchange as defined in claim 16, further including a plurality of dial pulse acceptors connected to said operator service link network for connection to one of said trunk circuits and a plurality of incoming registers each connected directly to a selected one of said dial pulse acceptors and to said translator for storing and analyzing digit signals received from outside the exchange.

18. A private automatic branch exchange as defined in claim 16, further including a plurality of transfer line circuits connected to said line link network and a plurality of transfer circuits connected on the operator side of said operator service link network for connecting an incoming/outgoing trunk through said operator service link network to a transfer line circuit so as to permit a subscriber line circuit connected to said incoming/outgoing trunk to apply digit signals via said transfer line circuit, said line link network, a junctor and said service link network to a local register in order to initiate the establishment of a transfer communication path through said transfer line circuit, said line link network, a junctor and said trunk link network to a second subscriber line circuit.

19. A private automatic branch exchange as defined in claim 18, further including transfer common means having a direct connection between said transfer circuits and the input of said service link network for establishing an additional communication path in parallel with said transfer communication path directly from said incoming/outgoing trunk circuit through said trunk link network and said line link network.

20. A private automatic branch exchange as defined in claim 19, wherein said transfer common means includes means responsive to establishment of said additional communication path for releasing said transfer communication path.

21. A private automatic branch exchange as defined in claim 18, wherein said incoming/outgoing trunks each include flash detection means for detecting an impulse of particular time duration and means responsive to class-of-service data from said storage means for signaling said common control means for connection to a transfer circuit where transfer is permitted by said data and for connection to an operator position circuit where transfer is not permitted by said data.

22. A private automatic branch exchange as defined in claim 21, further including a plurality of loop circuits associated in groups with each operator position circuit and connecting said position circuit to said operator service link network.

23. In combination with a central office including a line link network, a service link network, a trunk link network, a plurality of registers, a plurality of junctors, a plurality of subscriber line circuits and a plurality of trunk circuits, and common control means for interconnecting said plurality of subscriber line circuits through a junctor and said service link network to a selected register, to one another through said line link network and a junctor and to a trunk circuit through said line link network, a junctor and said trunk link network, an operator control arrangement comprising an operator service link network, a plurality of operator position circuits, an operator console connected to each operator position circuit and additional common control means for selectively connecting said operator position circuits through said operator service link network to a selected trunk circuit.

24. A private automatic branch exchange as defined in claim 23, further including a plurality of loop circuits associated in groups with each operator position circuit and connecting said position circuit to said operator service link network.

25. A private automatic branch exchange as defined in claim 24 wherein said trunk circuits include a plurality of incoming/outgoing trunks for connecting subscriber line circuits to the outside world, a plurality of attendant trunks for connecting a subscriber line circuit to an operator position circuit and a plurality of access trunks for connecting an operator position circuit to a subscriber line circuit.

* * * * *